United States Patent
Lessner et al.

[11] Patent Number: 5,916,627
[45] Date of Patent: Jun. 29, 1999

[54] CONDUCTIVE POLYMER USING SELF-REGENERATING OXIDANT

[75] Inventors: Philip M. Lessner; John T. Kinard, both of Simpsonville; Brian J. Melody, Greenville, all of S.C.

[73] Assignee: Kemet Electronics Corp., Greenville, S.C.

[21] Appl. No.: 09/002,091

[22] Filed: Dec. 31, 1997

[51] Int. Cl.$^6$ .............................. B05D 1/36; B05D 5/12
[52] U.S. Cl. ............................................. 427/79; 427/341
[58] Field of Search ..................................... 427/79, 341

[56] References Cited

U.S. PATENT DOCUMENTS

| | | |
|---|---|---|
| 3,635,927 | 1/1972 | Johnson . |
| 4,604,427 | 8/1986 | Roberts et al. . |
| 4,697,000 | 9/1987 | Witucki et al. . |
| 4,847,115 | 7/1989 | Warren et al. . |
| 5,034,335 | 7/1991 | Sagnes et al. . |
| 5,035,926 | 7/1991 | Jonas et al. . |
| 5,089,294 | 2/1992 | Ratcliffe ................................. 427/108 |
| 5,198,266 | 3/1993 | Witucki et al. ........................ 427/126.2 |
| 5,385,956 | 1/1995 | Schellenkens et al. . |
| 5,415,893 | 5/1995 | Wiersma et al. . |
| 5,514,771 | 5/1996 | Nakama et al. ........................ 528/423 |

FOREIGN PATENT DOCUMENTS

| | | |
|---|---|---|
| 61-111325 | 5/1986 | Japan . |
| 1-040561 | 2/1989 | Japan . |
| 6-016867 | 1/1994 | Japan . |

*Primary Examiner*—Erma Cameron
*Attorney, Agent, or Firm*—Banner & Witcoff, Ltd.

[57] ABSTRACT

Conductive polymers are formed with a self-regenerating oxidant system made with a reversibly reducible metal salt at amounts sufficient to polymerize a cyclic monomer through oxidation and leave a reduced metal ion, and an oxidant in an amount sufficiently small and under conditions sufficient to oxidize the reduced metal ion but avoid oxidation or degradation of the polymer. The most preferred combination of agents includes ferric nitrate and a small amount of ammonium nitrate at a pH within the range of 2 to 7.

16 Claims, No Drawings

CONDUCTIVE POLYMER USING SELF-REGENERATING OXIDANT

FIELD OF THE INVENTION

The invention relates to the manufacture and use of conductive polymers by oxidation of monomers with a composition comprising iron ($Fe^{3+}$) and nitrate.

BACKGROUND OF THE INVENTION

Conductive polymers are used in a number of applications including fibers, films, and coatings. Acid-doped polyaniline is often a focus of developmental work with conductive polymers, and solutions containing polyaniline in a solvent are commercially available.

One of the most important uses for conductive polymers is as the electrolyte layer in capacitors made from pressed powders. In such articles, one or more coatings of electrically conductive polymer can be used as a solid electrolyte between the dielectric oxide layer and the electrodes. With some systems, the porous, anodized substrate is impregnated with a solution containing the monomer or monomers. A polymerization agent is added (if not mixed with the monomers), and the conditions are adjusted to polymerize the monomers. The polymer is then washed, and the anode is "reformed" to activate the anode. Several impregnation and reformation steps may be used.

One polymerization agent of interest is a ferric ($Fe^{3+}$) salt as an oxidizing agent at a 1:1 molar ratio with the monomer to polymerize pyrrole or ethylenedioxythiophene (EDT) monomers. The polymerization can be performed in organic or aqueous systems, and the resulting films or powders are highly conducting. See, U.S. Pat. Nos. 4,697,000 and 4,847,115 (combination of strong oxidant and dopant anion for pyrrole polymerization) and U.S. Pat. No. 5,035,926 (iron (III) salt for polymerization of EDT).

Unfortunately, the reaction rate of the polymerization is very difficult to control. It is also difficult to remove all of the resulting ferrous ($Fe^{2+}$) salt produced by the reaction, particularly when the oxidation polymerization is in-situ on a porous body. Residual iron in a capacitive body may cause high leakage current rates, ionic migration in humid environments, or both.

Previous attempts to replace the ferric salt with another oxidizing agent have not been able to produce a commercially viable system. Ammonium persulfate will perform the oxidation adequately but is even more difficult to control than ferric salt. The use of molecular oxygen to regenerate the ferrous salts has degraded the polymer and posed problems in controlling the activity level of the oxygen. See U.S. Pat. No. 4,604,427 that discloses the use of various oxidation agents to polymerize cyclic monomers into conductive polymers.

It would be useful to have a reliable system for oxidizing monomers to form a conductive polymer without leaving unacceptable levels of undesired conductive salts.

SUMMARY OF THE INVENTION

It is an objective of the invention to provide a system for oxidative polymerization of monomer that produces a controllable reaction.

It is another objective of the invention to provide a system for oxidative polymerization that does not degrade or otherwise adversely affect the polymerization reaction of the resulting polymer.

It is a further object of the invention to provide an oxidative polymerization system that can be used to form a conductive coating on porous surfaces.

In accordance with these and other objects of the invention that will become apparent from the description herein, a process according to the invention includes the steps of:

The oxidation system of the present invention uses an in-situ re-oxidizing agent to re-oxidize the reducible metal salt component that performs the monomer oxidation function. This combination allows the rate and extent of the polymerization reaction to be controlled through both a reduced amount of reducible metal salt, the amount of re-oxidizing agent, and the time needed to perform the re-oxidation before additional monomer can be polymerized.

DETAILED DESCRIPTION

Electrically conductive polymers are formed by contacting a monomer that will polymerize by oxidation with a self-regenerating oxidation system. The self-regeneration aspect of the oxidation system allows lower levels of reducible metal salt to be used and, therefore, reduced amounts of potentially residual metal without oxidizing or otherwise adversely affecting the polymer. The re-oxidizing agent does not, however, participate meaningfully in the rate of the polymerization reaction due to kinetic or stearic limitations on the reaction between the monomer and the re-oxidizing agent.

Polymerizable monomers useful in the present invention include materials that will polymerize under oxidizing conditions and become insoluble in the solvent or solvent system used to apply the monomer and/or the oxidation system components. Such materials generally include cyclic monomers such as pyrrole, ethylenedioxythiophene (EDT), aniline, and substituted analogs of such monomers (e.g., N-methylpyrrole, 3-methylpyrrole, 3,5-dimethylpyrrole, 2,2'-bipyrrole, 2-methylaniline, 3-methylaniline, and N-phenyl-1,4-diaminobenzene).

The monomer is applied at a concentration adequate to form a polymer of the desired chain length and thickness while being balanced against any competing needs that would limit the viscosity of the application solution, e.g., penetration into fine pores to form a uniform coating over all exposed surfaces. A generally useful concentration for the monomer solution is within the range of 0.01–25 wt %, depending on the type of polymer structure desired. The selection and optimization of monomer solution concentration is within the existing skill level of the art for the particular use to be made of the resulting polymer. For a polymer layer over a body with fine pores, a useful monomer concentration is generally within the range of about 0.01–0.1 wt % in a suitable solvent.

The oxidation system used in the present invention is a combination of: (a) a reversibly reducible, reactive metal salt in an amount sufficient to polymerize a polymerizable monomer through oxidation to form a reduced metal salt and an electrically conductive polymer; and (b) a re-oxidizing agent in an amount sufficient to oxidize the reduced metal salt at the polymerization conditions and regenerate the reactive metal salt. Preferably, the re-oxidizing agent is a sacrificial component that degrades completely as a result of the regenerating oxidation reaction and leaves no residue in the polymer. Washing the polymer with clean solvent will remove residual amounts of the salt adhered to the polymeric surface.

The reactive metal salts useful for the present invention include ferric salts ($Fe^{3+}$), cupric salts ($Cu^{2+}$), and ceric salts ($Ce^{4+}$) compatible with the re-oxidizing agent anion, e.g., an ammonium nitrate re-oxidizing agent would suggest the use of a ferric nitrate as the metal salt. The preferred reactive metal salt is a ferric salt.

The reactive metal salt is used in an amount within the range of about 0.001–0.5 mol of metal salt per mole of monomer. Preferably, the reactive metal salt is used at a concentration within the range of about 0.01 to about 0.1 moles of metal cation per mole of monomer.

The re-oxidizing agent is a reducible chemical that will regenerate the reactive metal salt and form harmless byproducts or degrade completely from the oxidation without adversely affecting the polymer or being present in a concentration that is sufficiently high to initiate oxidation of the monomer. Importantly, the oxidation system of the invention is not properly considered to be a mere mixture of individually useful oxidizing agents. Suitable re-oxidizing agents include nitrate salts (e.g., ammonium), oxygen, and other sources of chemically available oxygen The re-oxidizing agent is used in an amount within the range from about 0.5 to about 2 moles per mole of monomer. Preferably, the re-oxidizing agent is used in an amount within the range from about 1 to about 2 moles per mole of monomer.

When ferric nitrate is the oxidizing agent and ammonium nitrate is the re-oxidizing agent, the pH of the oxidizing system is preferably adjusted to be within the range from about 2 to about 7, preferably a range of 4 to 7. Within these ranges and at a typical polymerization temperature of about 35° C. to about 85° C., the ammonium nitrate is sufficiently active to oxidize the ferrous salt and form a reactive ferric salt to complete polymerization without oxidizing the resulting polymer.

The monomer and oxidation system can be applied separately or simultaneously (under conditions that do not favor polymerization) with a mutually compatible solvent or solvent system. Suitable solvents for use with the present invention include water, alcohols (methanol, ethanol, isopropyl, etc.), ketones (e.g., aceetophenone), halogenated hydrocarbons (e.g., methylene chloride, chloroform, and carbon tetrachloride), esters (e.g., ethyl acetate or butyl acetate), aromatic hydrocarbons (e.g., benzene, toluene, or xylene), aliphatic hydrocarbons (e.g., pentane, hexane, heptane, and cyclohexane), nitrites (e.g., acetonitrile and benzonitrile), sulphoxides (e.g., dimethyl sulfoxide), and virtually any other solvent that does not adversely affect the deposition and polymerization of the monomer.

Polymer dopants are typically added to the polymer by admixture with the applied monomer solution or via the solution containing the oxidation system. The acid dopants used for the polyaniline-based polymers are generally selected from anions of sulfonic acids (e.g., dinonyl naphthalene sulfonic acid (DNSA), toluenesulfonic acid, dodecylbenzine sulfonic acid, camphor sulfonic acid, allylsulfonic acid, 1-propanesulfonic acid, 1-butananesulfonic acid, 1-hexanesulfonic acid, 1-heptanesulfonic acid, benzenesulfonic acid, styrenesulfonic acid, naphthalenesulfonic acid, including homologs and analogs thereof), and carboxylic acids (e.g., acetic acid and oxalic acid). The preferred organic sulfonic acid dopants includes toluenesulfonic acid, dodecylbenzine sulfonic acid, and camphor sulfonic acid.

The polymer resulting from the present process can be used to form a number of diverse conductive articles including fibers, films, coatings (particularly coatings for dissipating static electricity), coated articles, batteries, electrolytic sensors, and capacitive elements. The polymer can be applied to a substrate with a number of techniques including spraying, knife coating, brushing, printing, immersion, and impregnation with or without external assistance in the form of an applied pressure or vacuum.

One coated article of particular interest is a capacitive element that uses a conductive polymer as a solid electrolyte over a dielectric substrate layer. The valve metals from which the capacitive elements are formed preferably are made of materials that form an insulating film when the body is positively charged. When the body is negatively charged, the film will conduct. Suitable materials include the Group IV and V metals particularly niobium, tantalum, zirconium, and titanium) and aluminum.

When the anode element is formed from a powder, appropriate powder sizes are within the range of 0.05 to 50 microns. These powders are pressed with or without a binder to form a green anode body having a density of about 30–70% theoretical density. The green body is then sintered at a temperature within the range from about 1200° C. to about 1800° C. Aluminum is preferably used in the form of a foil or etched foil that is either rolled or stacked.

The anode element is then "anodized" by suspending the sintered body in an electrolyte solution at a formation voltage of 3–4 times the rated voltage of the element. For example, a typical part rated at 10 volts would be formed at 30–40 volts, usually 35 volts. Suitable electrolyte solutions include phosphoric acid or ammonium nitrate in water with or without thickening agents, solvents, co-solvents, surfactants, or other conventional additives.

Once anodized, the anode element is coated with one or more layers of an electrically conductive, polymer by impregnating the capacitive element in a solution containing the monomer and any dopant in a solvent. If performed under conditions that do not prematurely promote polymerization, the solvent system used for the monomer and dopant can also include the oxidation system components of the present invention. The coated element is then heated to polymerize the monomer and drive off the solvent. Suitable heating temperatures are within the range from about 35° C. to about 120° C., preferably 35°–85° C. The polymer-coated capacitive element is then "reformed" one or more times by immersing the element in an acidic reforming solution.

The monomer polymerizes during the heating step by oxidation from the reducible metal salt. The metal salt is thereby reduced. Unless otherwise removed, this reduced metal salt would be an undesirable cause of high leakage current values in the final element or ionic migration in a humid environment. Under suitable conditions, however, the re-oxidizing component of the present invention has a sufficient oxidation potential to oxidize the reduced metal salt back to a more stable, reducible metal salt form. That salt is soluble in the original solvent and can be removed from the element, along with any residual monomer or by-product materials that are undesirable in the final capacitive element are readily removed by washing with water, solvents, and/or surfactants. Preferred washing agents include methanol, isopropyl alcohol, or acetone.

The thickness of the electrolyte layer can be increased by repeated the above process steps until an adequate thickness is achieved. In general, the polymeric coating can be built up with 1–20 repetitions of the impregnation, heating, and washing steps.

The reformed capacitive element is then finished to make a stock part. Finishing would typically entail an outer coating of the undoped solid electrolyte polymer, imprinting the element with an electrode pattern, sealing the unit in a nonconductive material, e.g., epoxy, and forming a multielement assembly (if desired). The anode body of such a capacitor is preferably made of a valve metal like aluminum or tantalum, with tantalum being generally more preferred between the two. Particularly preferred are sintered tantalum powder compacts.

In one process according to the invention, the sintered tantalum anode body is impregnated with a relatively dilution solution of monomer. Vacuum or pressure can be used to enhance the penetration of the solution into the pores and interstices of the anode body. The impregnated anode body is then contacted with a solution at a pH within the range of 2 to 7, preferably within a pH range of 4–7, containing ferric nitrate and ammonium nitrate for polymerization of the polymer over the surface of the anode body and within the pores thereof. The ammonium nitrate is sufficiently reactive to re-oxidize the ferrous salt that will be formed from the reaction and make the ferric salt available for further polymerization until either the monomer or re-oxidizing agent is depleted. The remaining metal salt is then washed from the surface.

EXAMPLES

Example 1

Ammonium nitrate (1 gm), ferric nitrate (0.13 gm), and p-toluene sulfonic acid (1.05 gm) and ethylenedioxythiophene(2.25 gm) were added to 50 ml of isopropyl alcohol. The solution was a yellow-orange color and at a pH within the range of 4–7.

A few drops of the solution were placed on a glass slide. Evaporation of the alcohol solvent left a powdery black precipitate. The precipitate was tested and found to be conductive.

We claim:

1. A process for forming an electrically conductive polymer by contacting (a) a monomer that is polymerizable with oxidation to form a conductive polymer, (b) an amount of a reducible metal salt that will oxidize the monomer to form an electrically conductive polymer and a reduced metal salt, and (c) an amount of an re-oxidation agent sufficient to oxidize reduced metal salt to a reactive metal salt without significantly oxidizing said conductive polymer.

2. A process according to claim 1 wherein said monomer is selected from the group consisting of pyrrole and ethylenedioxythiophene.

3. A process according to claim 1 wherein said reducible metal salt is a ferric salt.

4. A process according to claim 3 wherein said reducible metal salt is provided in the form of ferric nitrate.

5. A process according to claim 1 wherein said re-oxidizing agent is a nitrate.

6. A process according to claim 5 wherein said nitrate is ammonium nitrate.

7. A process according to claim 1 wherein a substrate to be coated with polymer is impregnated with a first solution containing said monomer followed by contact with a second solution containing said reducible metal salt and re-oxidizing agent.

8. A process according to claim 7 wherein said second solution exhibits a pH within the range from about 2 to about 7.

9. A process according to claim 7 wherein said first solution contains a dopant for said polymer.

10. A process according to claim 9 wherein said dopant is toluene sulfonic acid.

11. A process for making a capacitive element by the steps comprising:
    (a) impregnating an anodized anode body with a solution comprising:
        (i) a monomer that is polymerizable with oxidation to form a conductive polymer, (ii) an amount of a reducible metal salt that will oxidize the monomer to form an electrically conductive polymer and a reduced metal salt, and (iii) an amount of an re-oxidation agent sufficient to oxidize reduced metal salt to a reactive metal salt without significantly oxidizing said conductive polymer, and
    (b) allowing said conductive polymer to be formed over the surface of the impregnated anode body.

12. A process according to claim 11 wherein the impregnating step is at a pH within the range of 2–7.

13. A process according to claim 11 wherein the impregnating step is performed with a pyrrole monomer, ferric nitrate as said reducible metal salt, and ammonium nitrate as said re-oxidizing agent.

14. A process according to claim 11 wherein said reducible metal salt is present in an amount within the range of 0.001–0.1 mole of metal cation per mole of monomer.

15. A process according to claim 11 wherein said re-oxidizing agent is present in an amount within the range of 1–2 moles per mole of monomer.

16. A process for making a capacitive element by the steps comprising:
    (a) impregnating an anodized anode body with a first solution comprising a monomer that is polymerizable with oxidation to form a conductive polymer,
    (b) contacting the impregnated anode body with a second solution comprising (i) an amount of a reducible metal salt that will oxidize the monomer to form an electrically conductive polymer and a reduced metal salt, and (ii) an amount of an re-oxidation agent sufficient to oxidize reduced metal salt to a reactive metal salt without oxidizing said conductive polymer, and
    (c) allowing said conductive polymer to be formed over the surface of the impregnated anode body.

* * * * *